US010645662B2

(12) United States Patent
Tidestav et al.

(10) Patent No.: US 10,645,662 B2
(45) Date of Patent: May 5, 2020

(54) SYNCHRONIZATION SIGNAL SEARCH

(71) Applicant: Telefonaktiebolaget LM Ericsson (publ), Stockholm (SE)

(72) Inventors: Claes Tidestav, Bålsta (SE); Joakim Axmon, Malmö (SE); Bengt Lindoff, Bjärred (SE); Reza Moosavi, Linköping (SE); Edgar Ramos, Kirkkonummi (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 99 days.

(21) Appl. No.: 15/505,409

(22) PCT Filed: Feb. 1, 2017

(86) PCT No.: PCT/EP2017/052138
§ 371 (c)(1),
(2) Date: Feb. 21, 2017

(87) PCT Pub. No.: WO2018/141379
PCT Pub. Date: Aug. 9, 2018

(65) Prior Publication Data
US 2018/0227865 A1    Aug. 9, 2018

(51) Int. Cl.
*H04W 36/04* (2009.01)
*H04W 48/16* (2009.01)
*H04W 56/00* (2009.01)
*H04W 72/04* (2009.01)
*H04W 72/08* (2009.01)
*H04W 36/00* (2009.01)

(52) U.S. Cl.
CPC ..... *H04W 56/001* (2013.01); *H04W 36/0085* (2018.08); *H04W 36/04* (2013.01); *H04W 48/16* (2013.01); *H04W 72/0453* (2013.01); *H04W 72/085* (2013.01)

(58) Field of Classification Search
None
See application file for complete search history.

(56) References Cited

U.S. PATENT DOCUMENTS 7,526,257 B2 * 4/2009 Ogura ................... H04W 36/30
                                                          455/78
8,391,799 B2 * 3/2013 Fukushi ................ H04W 48/16
                                                          455/436

(Continued)

FOREIGN PATENT DOCUMENTS

WO    2015183484 A1    12/2015

*Primary Examiner* — Alpus Hsu
(74) *Attorney, Agent, or Firm* — Murphy, Bilak & Homiller, PLLC

(57) ABSTRACT

A wireless communication device in a cellular wireless communication system activates (402) radio receiver circuitry during repeated time windows. The repeated activation has a nominal repetition time interval, T, and each repeated time window has a window duration, DT. During each DT, detection (404) is made of a plurality of synchronization signals that are transmitted by a respective cell. Based on the detected synchronization signals, calculation (406) is made of a respective cell quality value. These calculated quality values are then provided (408) to a mobility process. Depending (410) on the calculated quality values and at least a first quality threshold, any of T and DT are adjusted (412).

21 Claims, 7 Drawing Sheets

(56) References Cited

U.S. PATENT DOCUMENTS

| | | | | |
|---|---|---|---|---|
| 8,675,554 | B2* | 3/2014 | Baglin | H04W 24/00 |
| | | | | 370/328 |
| 8,958,338 | B2* | 2/2015 | Laursen | H04J 3/0641 |
| | | | | 370/254 |
| 9,107,123 | B2* | 8/2015 | Wang | H04W 36/0088 |
| 9,247,515 | B2* | 1/2016 | Flore | H04W 56/0045 |
| 9,642,029 | B2* | 5/2017 | Weber | H04W 24/10 |
| 9,736,852 | B2* | 8/2017 | Pu | H04W 48/16 |
| 9,924,435 | B1* | 3/2018 | Worters | H04W 36/30 |
| 10,206,179 | B2* | 2/2019 | Weber | H04W 24/08 |
| 10,271,252 | B2* | 4/2019 | Jung | H04W 36/04 |
| 2006/0205406 | A1 | 9/2006 | Pekonen et al. | |
| 2008/0220784 | A1* | 9/2008 | Somasundaram | |
| | | | | H04W 36/0083 |
| | | | | 455/437 |
| 2009/0181676 | A1* | 7/2009 | Lee | H04J 11/0093 |
| | | | | 455/436 |
| 2011/0249556 | A1* | 10/2011 | Matsutani | H04J 13/16 |
| | | | | 370/235 |
| 2015/0350973 | A1* | 12/2015 | Yang | H04W 48/18 |
| | | | | 455/437 |
| 2016/0029314 | A1 | 1/2016 | Damji et al. | |
| 2016/0295471 | A1* | 10/2016 | Song | H04W 48/20 |
| 2016/0295636 | A1* | 10/2016 | Yang | H04B 7/0413 |
| 2016/0316411 | A1* | 10/2016 | Jung | H04W 4/70 |
| 2016/0337931 | A1* | 11/2016 | Wang | H04W 4/70 |
| 2016/0360455 | A1* | 12/2016 | Yang | H04W 36/10 |
| 2017/0078939 | A1* | 3/2017 | Takahashi | H04W 36/24 |
| 2017/0078991 | A1* | 3/2017 | Chae | H04W 48/20 |
| 2017/0245233 | A1* | 8/2017 | Jung | H04W 56/00 |
| 2017/0339650 | A1* | 11/2017 | Jung | H04W 76/27 |

* cited by examiner

SYNCHRONIZATION SIGNAL SEARCH

TECHNICAL FIELD

Embodiments herein relate to facilitating synchronization between a wireless communication device and a wireless communication network.

BACKGROUND

The evolution of wireless communication systems has followed a sequence of "generations", from first generation analog systems and second generation (2G) digital systems that were mainly focused on providing circuit switched voice services, via third generation (3G) systems that were capable of also providing moderately high data rate packet switched services, to the current fourth generation (4G) systems in which all services are provided in terms of packet data services. A widespread 4G standard is the third generation partnership project (3GPP) long term evolution (LTE). The work of defining a fifth generation (5G) wireless communication standard is very comprehensive and a future 5G standard should support a variety of different use cases such as mobile broadband (MBB) with massive multiple input-multiple output (MIMO) radio link support, low latency, high reliability communication, low cost machine type communication (MTC) as well as low power Internet of things (IoT) wireless communication devices.

In many of these 3GPP systems a cellular wireless communication device without any ongoing or recent data transmission is said to be in idle mode. In idle mode, the wireless communication device can perform random access to establish a connection to the network. The wireless communication device can also be paged by the network, whereby the network requests the wireless communication device to establish connection with the network for, e.g., an imminent downlink data transmission.

To enable random access, the wireless communication device must keep track of the cell it would use as its target for random access. This process is called cell selection or cell reselection. Cell selection/reselection are examples of mobility processes that can be performed by the wireless communication device. Another mobility process is a handover process where a wireless communication device, not necessarily being in an idle mode, finds that it must switch from communicating with a first cell to continue communication in a second cell, e.g. when traveling along a geographical path. In the following, reference will mainly be to the mobility process of cell reselection, although the issues discussed are similar in mobility processes such as cell selection and handover.

Based on synchronization signals transmitted from the different cells, the wireless communication device determines which cell is best, and the wireless communication device is said to camp on that cell. Once the wireless communication device has determined the best cell, it reads the system information for that cell, and with that information, the wireless communication device can perform random access.

When the wireless communication device geographically moves through the cellular network, it constantly reselects new cells. Once the wireless communication device detects that a synchronization signal is better than that of the cell on which the wireless communication device currently camps, reselection is made to the better cell. When the wireless communication device reselects a cell on the same carrier frequency, this process is called intra-frequency cell reselection.

The cell reselection process is performed with no or very little assistance from the network. Thus, the wireless communication device can find synchronization signals corresponding to new cells blindly or almost blindly. In particular, the wireless communication device searches blindly over a time window for any occurrence of these synchronization signals.

The wireless communication device's ability to blindly reselect a new cell builds upon the fact that in legacy systems, each cell is required to constantly transmit synchronization signals that the wireless communication device uses to identify neighbor cells as possible reselection targets. These synchronization signals are frequently transmitted, e.g., every 5 ms. By recording the signal received for a little more than 5 ms, the wireless communication device can capture all synchronization signals transmitted from close-by neighbor cells. By subsequently processing the recorded signal off-line, the wireless communication device can detect all relevant reselection target cells. Since the synchronization signals are transmitted quite frequently, the wireless communication device can activate its radio receiver circuitry for a short period, leading to low power consumption in the wireless communication device. Also, since the recorded signal is rather short, the amount of memory required to store the recorded signal is rather small.

In legacy systems, when the wireless communication device cannot find any cell above a certain quality threshold on the same carrier frequency, the wireless communication device starts to search for neighbor cells on other carrier frequencies. This process is called inter-frequency cell reselection. The wireless communication device searches for neighbors on other carrier frequencies for some time. If it cannot find any cell on other carriers, the wireless communication device starts searching for cells with other radio access technologies (RATs), to perform a so called inter-RAT cell reselection.

For 5G cellular systems, it is likely that synchronization signals will be transmitted more sparsely, e.g., every 100 ms. Having a larger interval between the idle mode synchronization signals is crucial for the base station energy consumption.

The state-of-the-art solution to cell reselection is essentially turning the radio receiver on to record the signal received for a period that is slightly larger than the synchronization signal transmission interval, then switching the radio receiver off, and subsequently applying off-line processing on the recorded signal. For example, in an LTE system, the wireless communication device stores, e.g., 6 ms (noting that the synchronization signal distance in LTE is 5 ms) and correlates towards the primary synchronization signal (PSS) to find a correlation peak indicating a timing for a cell, and then at that timing correlates toward all secondary synchronization signal (SSS) sequences to find the best match. Then optionally that cell identity corresponding to the best SSS match is used to correlate to cell-specific reference signals (CRSs) (reference symbols) in order to verify the detection. If the reference signal received power (RSRP) is greater than a threshold, then the cell is determined to be present.

However, using the state-of-the-art solution with a large synchronization signal transmission interval requires the radio circuitry of the wireless communication device to operate for a long period, causing high energy consumption. Additionally, since the recorded signal is quite long, a large amount of memory will be required to store the recorded signal for subsequent off-line processing.

With regard to the mobility process of handover, similar drawbacks exist. Relying on state-of-the-art solutions for measurements on other cells would lead to that the wireless communication device would have to search for synchronization signals in a quite large interval. This would lead to similar effects on the wireless device power consumption and complexity.

SUMMARY

In view of the above, an object of the present disclosure is to overcome drawbacks related to synchronization between a wireless communication device and a network node in a wireless communication system.

This object is achieved by a method performed by a wireless communication device in a cellular wireless communication system that comprises a plurality of cells. The method comprises activating radio receiver circuitry during repeated time windows, the repeated activation having a nominal repetition time interval, T, and each repeated time window having a window duration, DT. During each DT, detection is made of a plurality of synchronization signals that are transmitted by a respective cell. Based on the detected synchronization signals, calculation is made of a respective cell quality value. These calculated quality values are then provided to a mobility process. Depending on the calculated quality values and at least a first quality threshold, any of T and DT are adjusted.

In other words, such a method applies a "multi-stage" procedure of enabling the provision of measures of cell quality to a mobility process, such as cell selection cell reselection and handover. The values of T and/or DT, which can be seen as defining a synchronization signal "search window", are adjusted in dependence on the quality values that are calculated during the repeated activations of the synchronization signal search window. This is advantageous in that it enables the radio circuitry in the wireless communication device to operate in an energy efficient way.

For example, the adjusting of any of T and DT may comprise, if none of the calculated cell quality values is above the first quality threshold, increasing DT and/or applying a time offset to T associated with at least one activation of the radio receiver circuitry.

In other words, in a situation where the mobility process is cell reselection, the wireless communication device searches in a small time interval DT as long as it can find a good enough cell to camp on. Only when the wireless communication device fails to find a good enough cell to camp on, i.e. obtaining synchronization via the small search window, the search window is increased in duration or the search window changes the position by the application of a time offset to T, whereupon the search continues using the increased search window and/or the offset T.

In some embodiments, a second quality threshold is used. In these embodiments, the adjusting of any of T and DT may comprise a check if none of the calculated cell quality values is above the first quality threshold, and if true then increasing DT. Else, i.e. if at least one of the calculated cell quality values is above the first quality threshold, a check is made if none of the calculated cell quality values is above the second quality threshold and if true then applying a time offset to T.

That is, by employing also a second quality threshold, the use of the radio receiver circuitry may be made even further efficient.

In another aspect there is provided a wireless communication device for a cellular wireless communication system that comprises a plurality of cells. The wireless communication device comprises radio receiver circuitry, a processor and a memory. The memory contains instructions executable by the processor whereby the wireless communication device is operative to:
   activate the radio receiver circuitry during repeated time windows (210), the repeated activation having a nominal repetition time interval, T, and each repeated time window having a window duration, DT,
   detect, during each DT, a plurality of synchronization signals (202, 204, 206, 208) transmitted by a respective cell,
   calculate, based on the detected synchronization signals, a respective cell quality value,
   provide the calculated quality values to a mobility process, and
   depending on the calculated quality values and at least a first quality threshold (1), adjust any of T and DT.

In a further aspect there is provided a computer program comprising instructions which, when executed on at least one processor in a wireless communication device, cause the wireless communication device to carry out the method as summarized above. In yet a further aspect there is provided a carrier comprising such a computer program, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Figure 1:
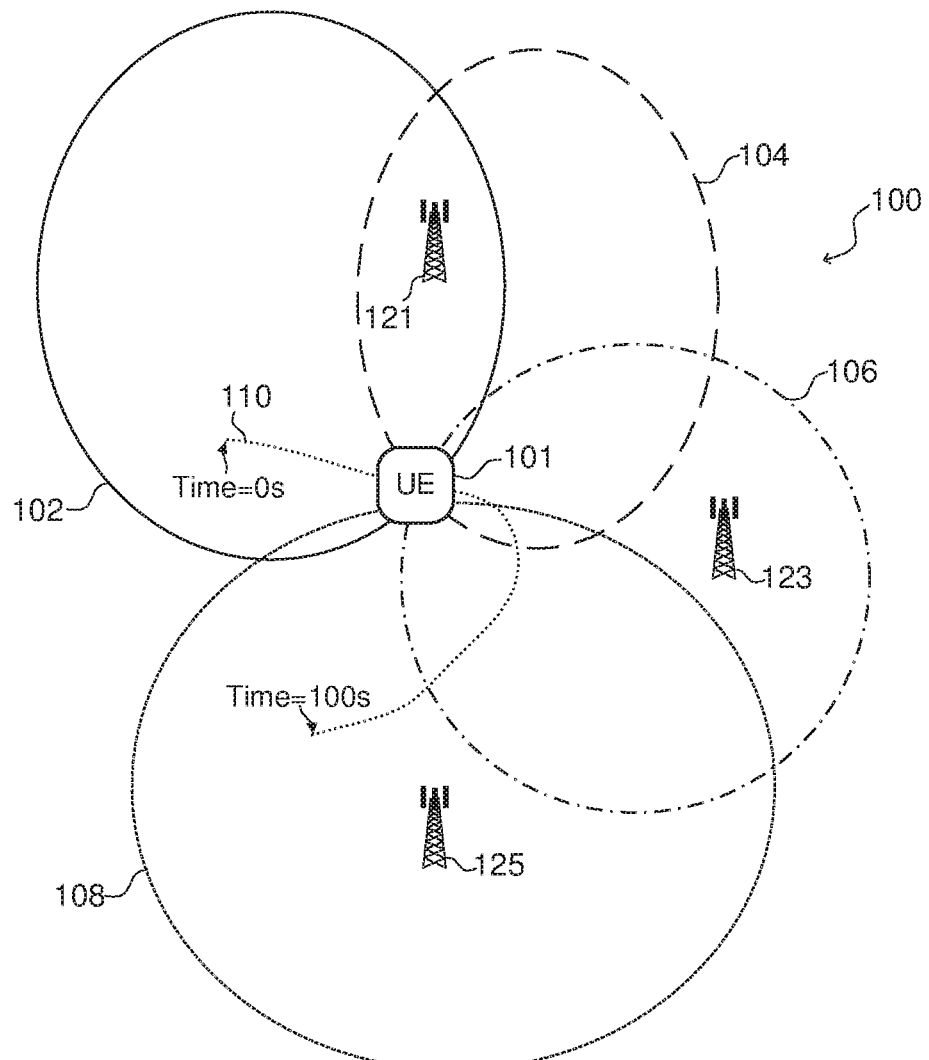
FIG. 1 schematically illustrates a wireless communication system.

Embodiments of the present disclosure may be implemented in one or more wireless communications systems. FIG. 1 depicts, very schematically, such a wireless communications system 100. The wireless communications system 100 may for example be any 3GPP system, including LTE systems or any other wireless communication system, including 5G systems.

The wireless communications system 100 may comprise a plurality of radio base stations and/or other network nodes. As exemplified in FIG. 1, the wireless communications system 100 comprises network nodes 121, 123, 125. As the skilled person will realize, the term "network node" may correspond to any type of radio network node or any network node which communicates with at least a radio network node. For example, the network nodes 121, 123, 125 may be respective radio base stations. The radio base stations 121, 123, 125 may also be referred to as a NodeB, an evolved Node B (eNB, eNodeB), a base transceiver station (BTS), Access Point (AP). Base Station, Wi-Fi AP, base station router, or any other network unit capable of communicating with a wireless communication device 101 within a coverage area, cell or radio beam 102, 104, 106, 108 served or maintained by a base station 121, 123, 125, noting that one base station may serve one or more cells or beams In embodiments herein the network nodes 121, 123, 125 are configured to communicate with and thereby serve wireless communication devices, such as the wireless communication device 101, also referred to as a user equipment (UE) herein. The wireless communication device 101 may, e.g., be in the form of a mobile terminal or a wireless terminal, a mobile phone, a smartphone, a computer such as a laptop, a Personal Digital Assistant (PDA) or a tablet computer, with wireless capability, target device, device to device UE, machine type communication (MTC) UE, Laptop Embedded Equipment (LEE), Laptop Mounted Equipment (LME), universal serial bus (USB) dongle etc. or any other radio network unit capable to communicate over a radio link in a wireless communications system. It is to be noted that the term user equipment used in this disclosure also covers other wireless devices such as Machine to machine (M2M) devices and any type of Internet-of-things (IoT) device, even though they are typically not directly operated by a user.

FIG. 1 illustrates an exemplifying scenario in the wireless communication system 100 where the wireless communication device 101 is moving along a path 110 beginning at a point in time at 0 seconds (s) and ending at a point in time at 100 s. While moving along the path 110, the wireless communication device 101 performs method steps associated with synchronization signals transmitted by the network nodes 121, 123, 125 as will be described in detail below.

As the skilled person will realize, the wireless communication device 101 comprises suitably configured functional units that are capable of, e.g., receiving and decoding radio signals, in addition to processing of information related to synchronization signals that is discussed in the present disclosure.

Figure 2:
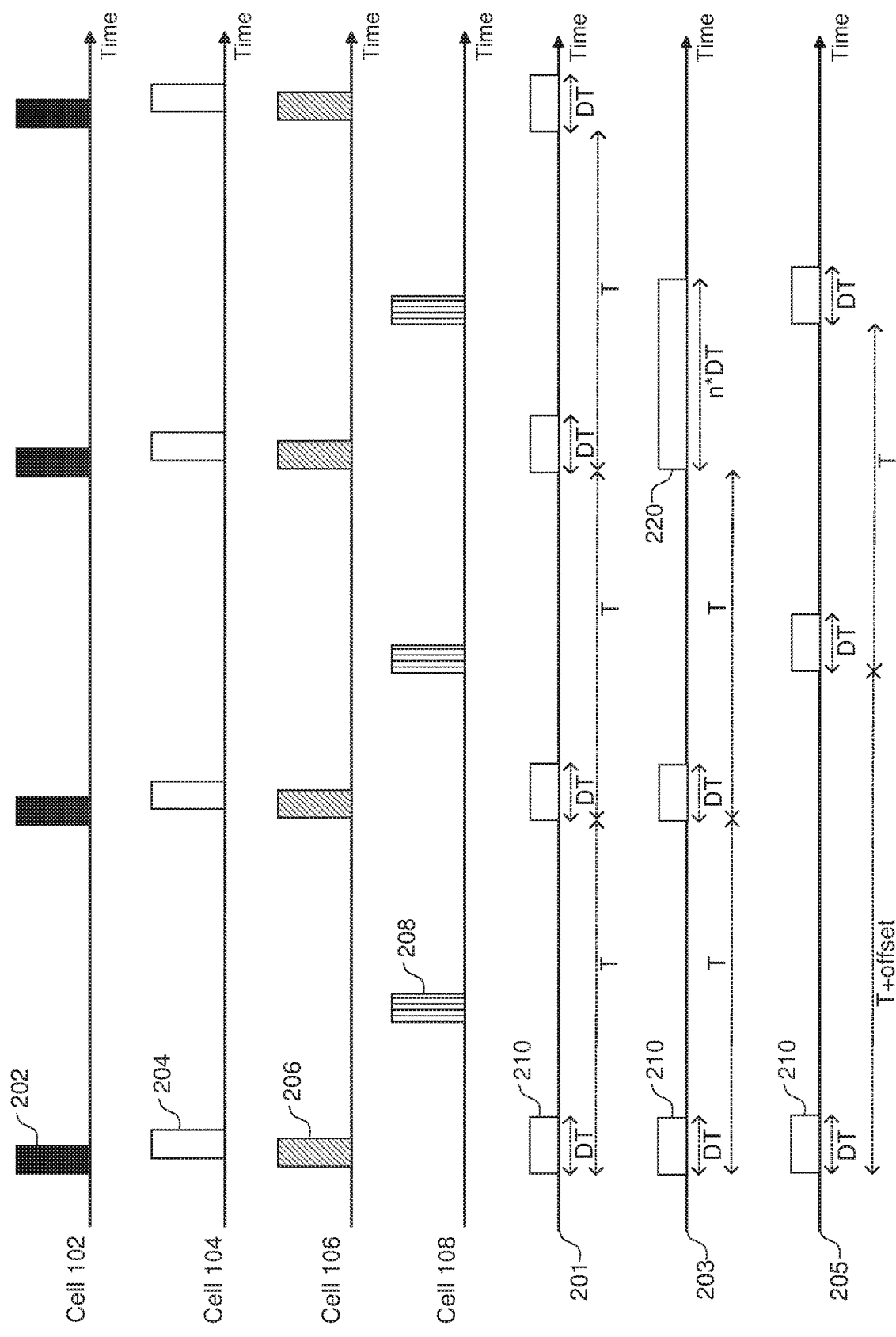
FIG. 2 schematically illustrates synchronization signal timings and search windows.
Figure 3:
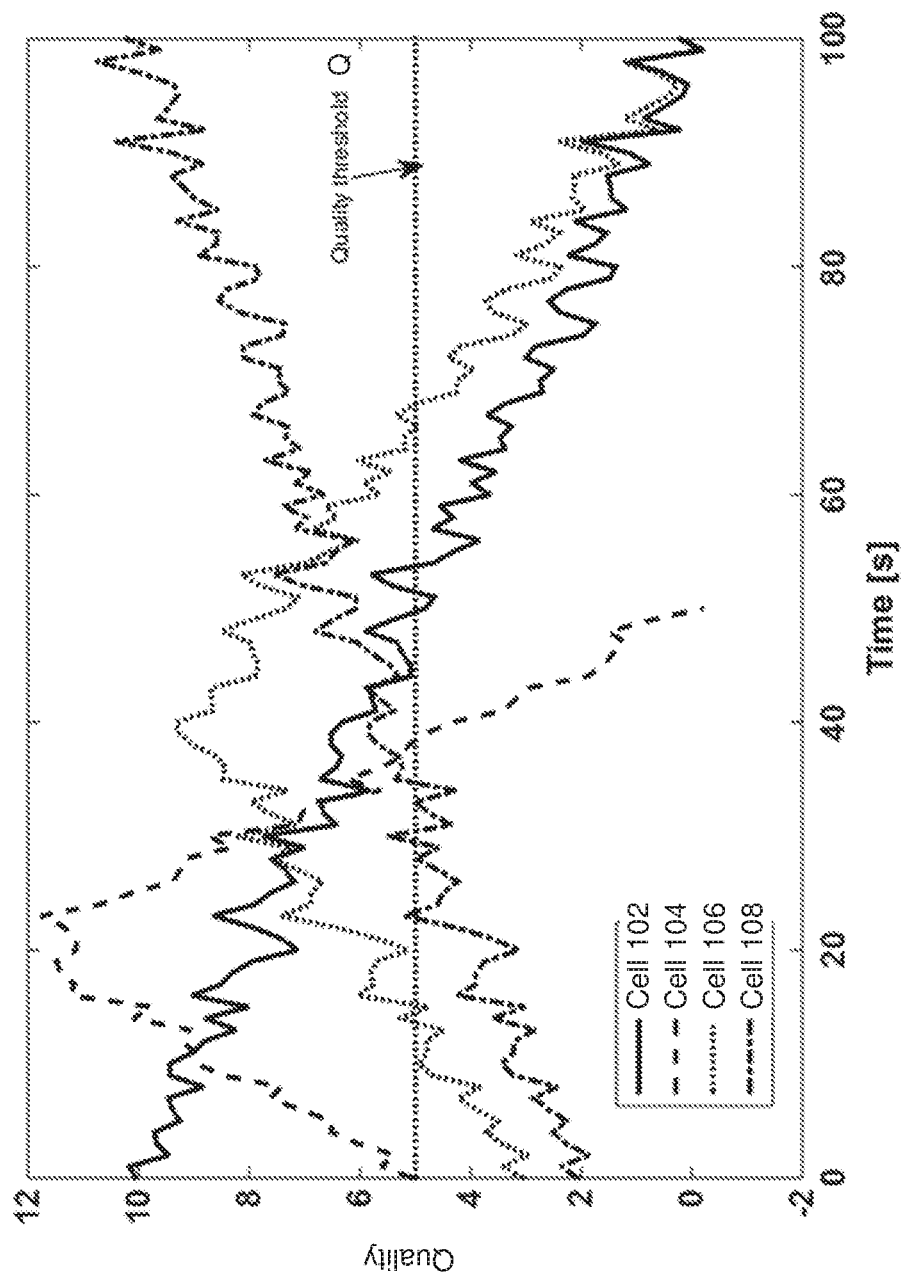
FIG. 3 schematically illustrates variations of cell quality.

Turning now to FIG. 2 and FIG. 3, and with continued reference to FIG. 1, an example scenario involving synchronization signal timings and cell quality values based on received synchronization signals from the four cells 102, 104, 106, 108 will be discussed. FIG. 2 illustrates that transmission instants of synchronization signals 202, 204, 206 are synchronized for the cells 102, 104, 106, whereas cell 108 uses another transmission timing for its synchronization signals 208. Initially, cell 102 is serving the wireless communication device 101, i.e. the wireless communication device 101 is initially camping on cell 102.

FIG. 3 shows an example of cell quality of the four cells 102, 104, 106, 108 as estimated by the wireless communication device 101 over time while moving along the path 110. The wireless communication device 101 uses received synchronization signals 202, 204, 206, 208 from respective cells 102, 104, 106, 108 to determine the quality values. The wireless communication device 101 may use one or several quantities that can be determined from the received synchronization signals 202, 204, 206, 208 to determine which cell is the best, e.g., reference signal received power (RSRP) or reference signal received quality (RSRQ).

Using the mobility process of cell reselection as an example, the wireless communication device 101 performs the cell reselection by searching for the synchronization signals 202, 204, 206, 208 from neighbour cells in a small time interval (in a typical embodiment 1-10 milliseconds (ms) long) that is explicitly or implicitly provided to the wireless communication device 101, as long as the quality of the serving cell is good enough, for instance when the determined quality is above a pre-determined or configured quality threshold. In the example of FIGS. 1, 2 and 3, the wireless communication device 101 is initially camping on cell 102, and hence the quality of cell 102 is better than that of cells 104, 106, and 108. An example quality threshold, Q=5 is indicated in FIG. 3, the quality threshold Q being defined such that the wireless communication device 101 can camp and access the cell if the cell quality is higher than Q=5. As long as the serving cell quality is higher than Q=5, the wireless communication device 101 will search in a small time window 210, which will only enable it to detect the synchronization signals 202, 204, 206 from respective cells 102, 104 and 106, but not the synchronization signal 208 from cell 108. FIG. 2 illustrates this along a timeline 201 where the time window 210 has a duration DT and a repetition time interval T, the values of which may have been initially provided via system information transmitted in the initial serving cell 102.

As FIG. 3 shows, at time=11s, cell 104 becomes better than cell 102, and the wireless communication device 101 reselects cell 104. As the synchronization signals 204 from cell 104 is transmitted during the window 210, the wireless communication device 101 is able to detect these.

The wireless communication device 101 continues to camp on cell 104 until time=30s, when the wireless communication device 101 finds the synchronization signal 206 transmitted from cell 106, which was also transmitted in the small time window 210. Here, the wireless communication device 101 reselect cell 106.

As time goes, the quality of cell 106 becomes worse. At time=55s, cell 108 becomes better than the serving cell 106. However, as the synchronization signals 208 for cell 108 are not transmitted in the small window 210, the wireless communication device 101 is not able to detect it. The quality of cell 106 is still good enough, as it is above the threshold Q=5, so the wireless communication device 101 keeps searching for synchronization signals in the small window 210.

As illustrated along timeline 203 in FIG. 2, at time=68s, the quality of the serving cell 106 falls below the quality threshold Q=5. As no other cell is better than cell 106 in the small search window 210, the wireless communication device 101 now increases (the duration of) the search window, e.g. by a factor n where n>1 may be a real number, to an increased search window 220 having duration n*DT. With the increased search window 220, the wireless communication device 101 finds the synchronization signal 208 from cell 108 and reselects to cell 108.

As illustrated along timeline 205, the wireless communication device 101 may change the search window 210 to another time offset to T+offset, while not increasing the duration DT, as indicated in timeline 205. Continuing such a scenario, if no cells are detected during a first time period T+offset, the wireless communication device 101 changes the time window position again by another offset value.

Figure 4A:
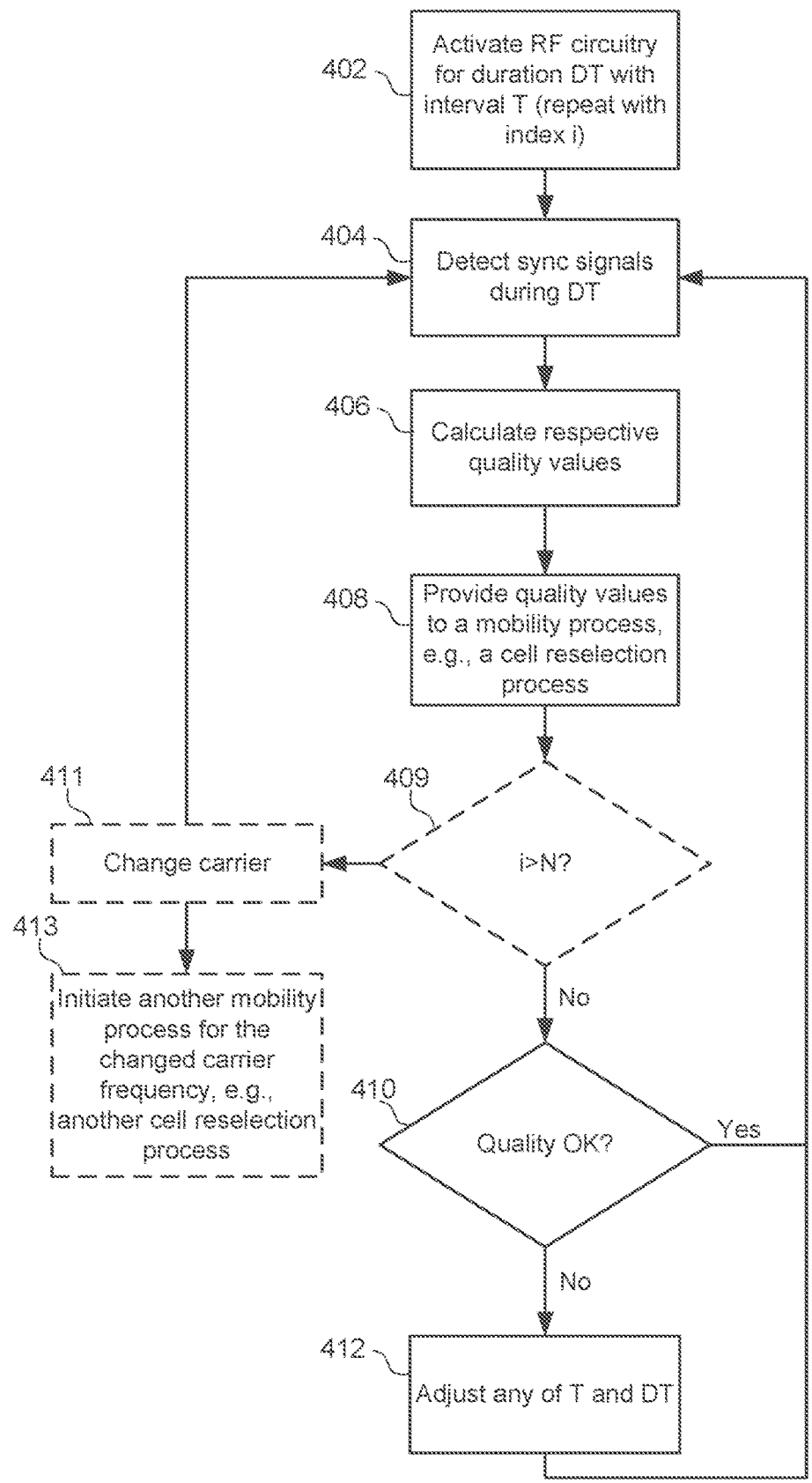
FIGS. 4a-d are flowcharts of methods.

The scenario described above involves the wireless communication device 101 performing a number of actions that form part of a method. Embodiments of such a method will now be described with reference to FIGS. 4a-e, and with continued reference to FIGS. 1 to 3. With reference to FIG. 4a, the method is performed by the wireless communication device 101 in the cellular wireless communication system 100 comprising a plurality of cells 102,104,106,108. The method comprises a number of actions as follows:

Action 402

Radio receiver circuitry is activated during repeated time windows 210. The repeated activation has a nominal repetition time interval T and each repeated time window has a window duration DT.

For example, T may be aligned with a synchronization signal of a cell that is the serving cell of the wireless communication device 101.

Action 404

During each DT, a plurality of synchronization signals 202, 204, 206, 208 transmitted by a respective cell 102, 104, 106, 108 are detected.

Action 406

Based on the detected synchronization signals, detected in action 404, a respective cell quality value is calculated.

As exemplified above, calculation of a cell quality value may comprise using use one or several quantities that can be determined from the received synchronization signals 202, 204, 206, 208, such as RSRP or RSRQ values. As the skilled person will realize, an actual cell quality value may be the determined RSRP or RSRQ values or any appropriate representation of these values.

Action 408

The calculated quality values are provided to a mobility process.

For example, the providing in action 408 of the calculated quality values to a mobility process may comprise providing the calculated quality values to any of a cell selection process, a cell reselection process and a handover process.

Action 410

A check is made such that, depending on the quality values calculated in action 406 and at least a first quality threshold Q1, any of T and DT is adjusted in action 412.

Figure 4B:
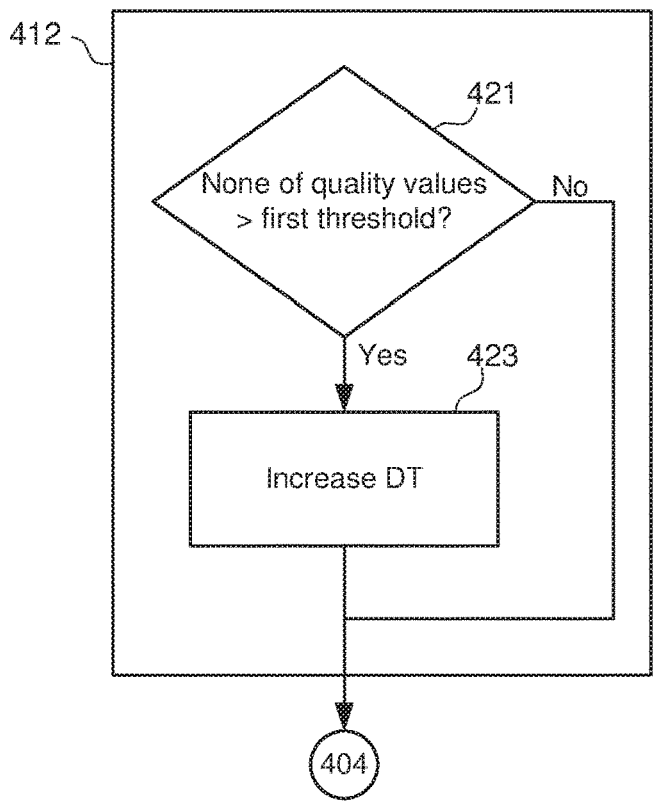

For example, the adjusting any of T and DT may comprise a check, as illustrated by an action 421 in FIG. 4b, if none of the calculated cell quality values is above the first quality threshold, and if the check is positive then increasing DT in an action 423. The increasing of DT may in some embodiments be performed in a stepwise manner. That is, a first increase of DT, associated with a first activation of the radio receiver circuitry, is by a first factor and a second increase of DT, associated with a second activation of the radio receiver circuitry, is by a second factor that is greater than the first factor. For example, such stepwise increasing of the search window may involve a first doubling of the search window and if the quality threshold is not reached, the search window size is tripled and so on. In some embodiments, the increase of DT makes DT equal to T or greater than T (whereupon no further increase of DT may take place).

Figure 4C:
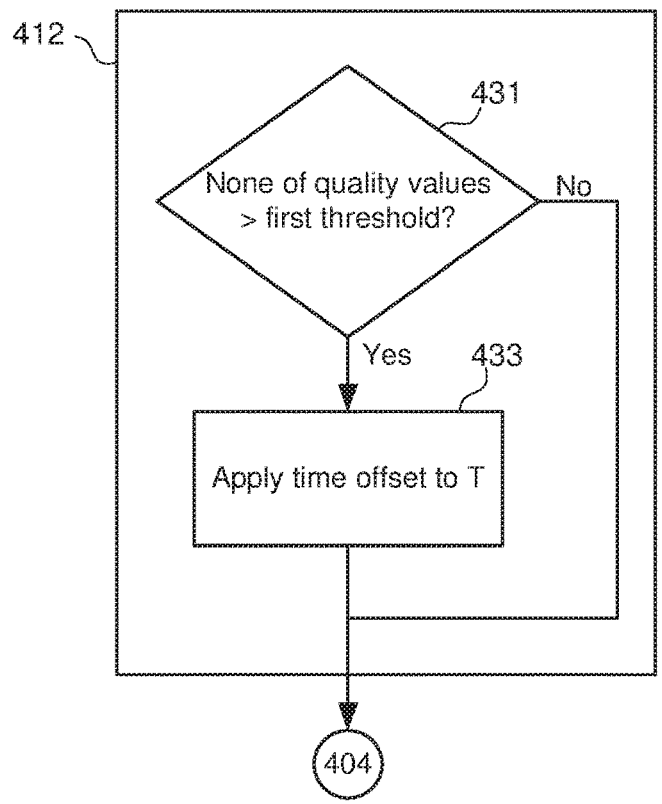

As illustrated in FIG. 4c, the adjusting any of T and DT may comprise a check, as illustrated by an action 431, if none of the calculated cell quality values is above the first quality threshold. If the check in action 431 is positive, then a time offset to T associated with at least one activation of the radio receiver circuitry is applied in an action 433.

Figure 4D:
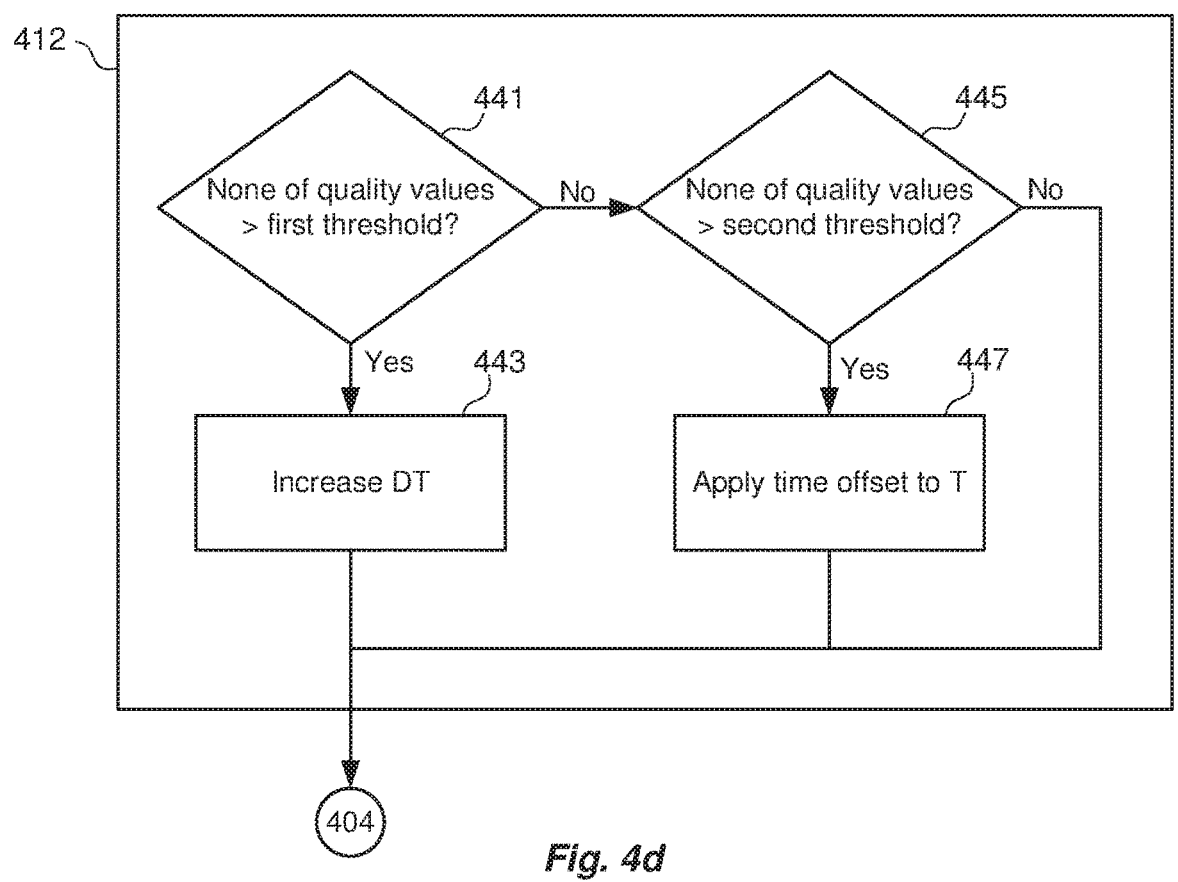
Figure 4E:
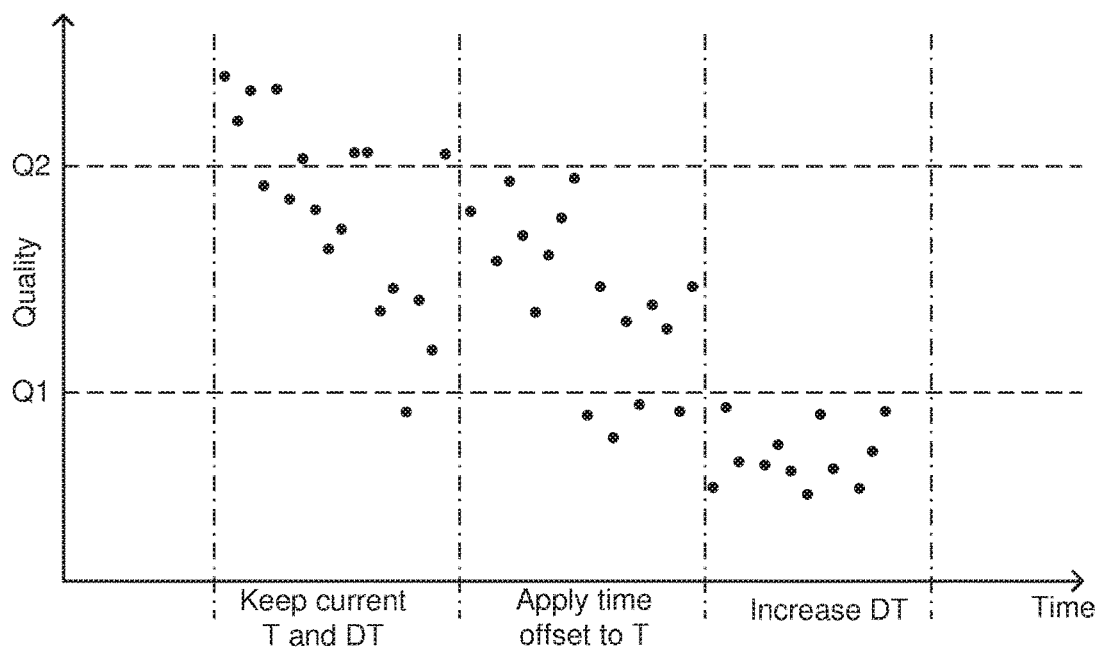
FIG. 4e schematically illustrates variations of cell quality.

Embodiments that involve a combination of increasing the size of the search window and offsetting the search window is illustrated in a flowchart in FIG. 4d and FIG. 4e. FIG. 4e is a graph comprising dots schematically representing calculated cell quality values. In these embodiments, two quality thresholds, Q1 and Q2, are used. That is, in some embodiments, the adjusting of any of T and DT may comprises a check action 441 if none of the calculated cell quality values is above the first quality threshold. If the check in action 441 is positive, then DT is increased in action 443. If the check in action 441 is not positive, then a check action 445 is performed where it is checked if none of the calculated cell quality values is above the second quality threshold. If this check is positive, then a time offset is applied to T in an action 447.

Returning to the flowchart in FIG. 4a, noting that the repeated activation of the radio receiver circuitry may be performed at a first carrier frequency. Embodiments of the method may then comprise additional actions as follows.

Action 409

Keeping count, i, of the number of activations of the radio receiver circuitry, a check is made whether i is greater than a predetermined number, N.

Action 411

If, in the checking action 409, none of the calculated cell quality values is above the first quality threshold, then a change is made of the first carrier frequency to a second carrier frequency and the repeated activation of the radio receiver circuitry at the second carrier frequency may be continued in action 404.

Action 413

Alternatively, having changed the first carrier frequency to a second carrier frequency in action 411, another mobility process may be initiated at the second carrier frequency. That is, in such embodiments the wireless communication device 101, if no cells are detected in an increased or time offset search window, the wireless communication device 101 may start to search for cells on other radio frequency carriers and even carriers of other RATs. Such a search on other carriers may be performed according to prior knowledge such a history list or based on information received form the serving/camping cell, e.g. in the form of broadcasted information. Moreover, initiating another mobility process in action 413 may e.g., entail using any appropriate legacy and/or prior art mobility process.

Figure 5:
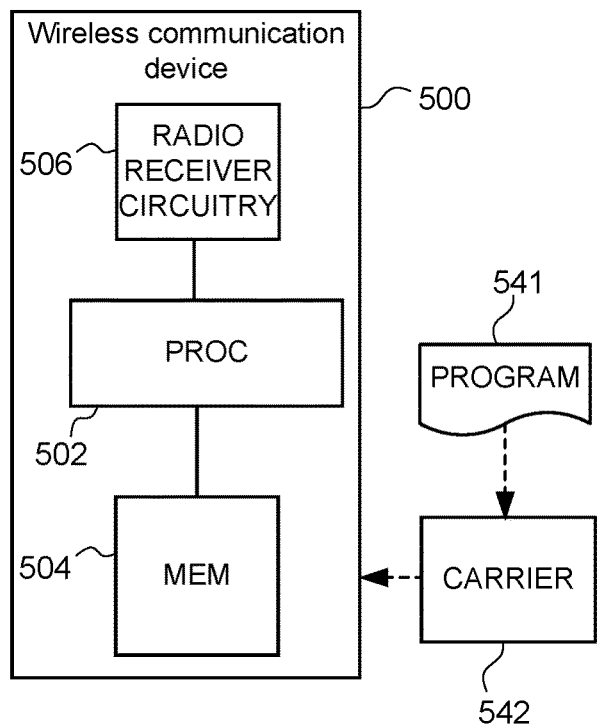
FIG. 5 schematically illustrates a wireless communication device.

Turning now to FIG. 5 and with continued reference to FIGS. 1 to 4a-e, a wireless communication device 500 will be described in some more detail. The wireless communication device 500, which may correspond to the wireless communication device 101 in FIG. 1, is for a cellular wireless communication system 100 comprising a plurality of cells 102,104,106,108. The wireless communication device 500 comprises radio receiver circuitry 506, a processor 502 and a memory 504. The memory 504 contains instructions executable by the processor 502 whereby the wireless communication device 500 is operative to:

activate the radio receiver circuitry 506 during repeated time windows 210, the repeated activation having a nominal repetition time interval, T, and each repeated time window having a window duration, DT, detect, during each DT, a plurality of synchronization signals 202, 204, 206, 208 transmitted by a respective cell 102,104,106,108, calculate, based on the detected synchronization signals 202, 204, 206, 208, a respective cell quality value, provide the calculated quality values to a mobility process, and depending on the calculated quality values and at least a first quality threshold Q1, adjust any of T and DT.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the wireless communication device 500 is operative such that the adjusting any of T and DT comprises:
if none of the calculated cell quality values is above the first quality threshold, increasing DT.

In some embodiments, the wireless communication device 500 is operative such that the increasing of DT is performed in a stepwise manner such that a first increase of DT, associated with a first activation of the radio receiver circuitry 506, is by a first factor and a second increase of DT, associated with a second activation of the radio receiver circuitry 506, is by a second factor that is greater than the first factor.

In some embodiments, the wireless communication device 500 is operative such that the increase of DT makes DT equal to T or greater than T.

In some embodiments, the wireless communication device 500 is operative such that the adjusting any of T and DT comprises:
if none of the calculated cell quality values is above the first quality threshold, applying a time offset to T associated with at least one activation of the radio receiver circuitry.

In some embodiments, the wireless communication device 500 is operative such that the adjusting any of T and DT comprises:
if none of the calculated cell quality values is above the first quality threshold, increasing DT, else
if none of the calculated cell quality values is above a second quality threshold, applying a time offset to T.

In some embodiments, the wireless communication device 500 is operative such that T is aligned with a synchronization signal of a cell that is the serving cell of the wireless communication device.

In some embodiments, the wireless communication device 500 is operative such that the repeated activation of the radio receiver circuitry 506 is performed at a first carrier frequency, and operative to:
if, after a predetermined number of activations of the radio receiver circuitry 506, none of the calculated cell quality values is above the first quality threshold, then:
change the first carrier frequency to a second carrier frequency and continue the repeated activation of the radio receiver circuitry 506 at the second carrier frequency.

In some embodiments, the wireless communication device 500 is operative such that the repeated activation of the radio receiver circuitry 506 is performed at a first carrier frequency, and operative to:
if, after a predetermined number of activations of the radio receiver circuitry 506, none of the calculated cell quality values is above the first quality threshold, then:
change the first carrier frequency to a second carrier frequency, and
initiate another mobility process at the second carrier frequency.

In some embodiments, the wireless communication device 500 is operative such that the providing of the calculated quality values to a mobility process comprises providing the calculated quality values to any of a cell selection process, a cell reselection process and a handover process.

Figure 6:
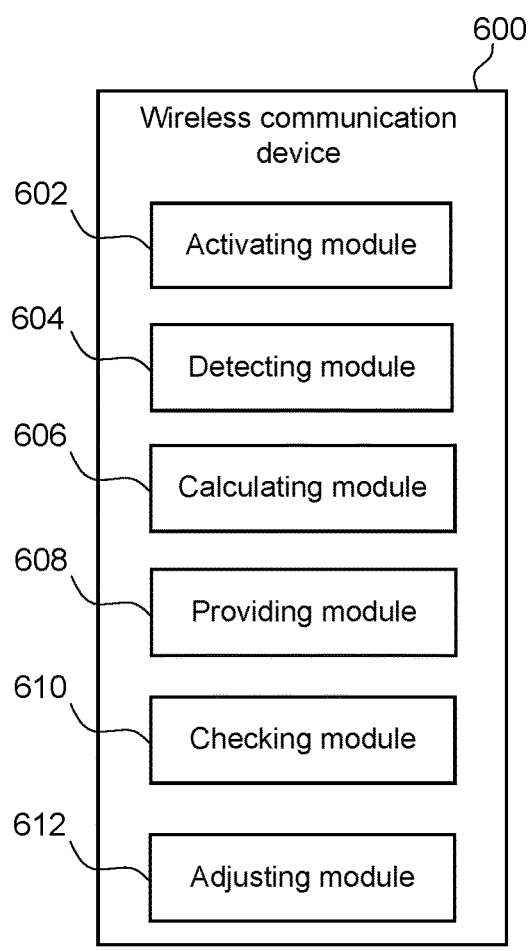
FIG. 6 schematically illustrates a wireless communication device.

Turning now to FIG. 6 and with continued reference to FIGS. 1 to 4*a-e*, a wireless communication device 600 will be described in some more detail. The wireless communication device 600, which may correspond to the wireless communication device 101 in FIG. 1, is for a cellular wireless communication system 100 comprising a plurality of cells 102,104,106,108. The wireless communication device 600 comprises:
an activating module 602 configured to activate the radio receiver circuitry 506 during repeated time windows 210, the repeated activation having a nominal repetition time interval, T, and each repeated time window having a window duration, DT.
a detecting module 604 configured to detect, during each DT, a plurality of synchronization signals 202, 204, 206, 208 transmitted by a respective cell 102,104,106, 108,
a calculating module 606 configured to calculate, based on the detected synchronization signals 202, 204, 206, 208, a respective cell quality value,
a providing module 608 configured to provide the calculated quality values to a mobility process, and
a checking module 610 configured to check on the calculated quality values and at least a first quality threshold Q1, and
an adjusting module 612 configured to adjust any of T and DT.

The wireless communication device 600 may comprise further modules that are configured to perform in a similar manner as, e.g., the wireless communication device 500 described above in connection with FIG. 5.

The invention claimed is:

1. A method performed by a wireless communication device in a cellular wireless communication system comprising a plurality of cells, the method comprising:
activating radio receiver circuitry of the wireless communication device during repeated time windows, the activating having a nominal repetition time interval, T, and each repeated time window having a window duration, DT;
detecting, during each DT, a plurality of synchronization signals transmitted for respective cells of the plurality of cells;
estimating, based on the detected synchronization signals, respective cell quality values for the plurality of cells;
providing the estimated cell quality values to a mobility process; and
depending on the estimated cell quality values and at least a first quality threshold, adjusting any of T and DT.

2. The method of claim 1, wherein the adjusting of any of T and DT comprises:
responsive to a determination that none of the estimated cell quality values is above the first quality threshold, increasing DT.

3. The method of claim 2, wherein the increasing of DT is performed in a stepwise manner such that a first increase of DT, associated with a first activation of the radio receiver circuitry, is by a first factor and a second increase of DT, associated with a second activation of the radio receiver circuitry, is by a second factor that is greater than the first factor.

4. The method of claim 2, wherein the increasing of DT makes DT equal to T or greater than T.

5. The method of claim 1, wherein the adjusting of any of T and DT comprises:
responsive to a determination that none of the estimated cell quality values is above the first quality threshold, applying a time offset to T associated with at least one activation of the radio receiver circuitry.

6. The method of claim 1, wherein the adjusting of any of T and DT comprises:

responsive to a determination that none of the estimated cell quality values is above the first quality threshold, increasing DT, else responsive to a determination that none of the estimated cell quality values is above a second quality threshold, applying a time offset to T.

7. The method of claim 1, wherein T is aligned with a synchronization signal of a cell that is the serving cell of the wireless communication device.

8. The method of claim 1, wherein the activating of the radio receiver circuitry is performed at a first carrier frequency, and wherein:

responsive to a determination that, after a predetermined number of activations of the radio receiver circuitry, none of the estimated cell quality values is above the first quality threshold, then:

change the first carrier frequency to a second carrier frequency and continue the activating of the radio receiver circuitry at the second carrier frequency.

9. The method of claim 1, wherein the activating of the radio receiver circuitry is performed at a first carrier frequency, and wherein:

responsive to a determination that, after a predetermined number of activations of the radio receiver circuitry, none of the estimated cell quality values is above the first quality threshold, then:

change the first carrier frequency to a second carrier frequency; and initiate another mobility process at the second carrier frequency.

10. The method of claim 1, wherein the providing of the estimated quality values to the mobility process comprises providing the estimated quality values to any of a cell selection process, a cell reselection process and a handover process.

11. A wireless communication device for a cellular wireless communication system comprising a plurality of cells, the wireless communication device comprising:

radio receiver circuitry;

a processor; and a memory, said memory containing instructions executable by said processor, whereby the processor causes said wireless communication device to:

activate the radio receiver circuitry during repeated time windows, the activating having a nominal repetition time interval, T, and each repeated time window having a window duration, DT;

detect, during each DT, a plurality of synchronization signals transmitted for respective cells of the plurality of cells;

estimate, based on the detected synchronization signals, respective cell quality values for the plurality of cells;

provide the estimated quality values to a mobility process; and depending on the estimated quality values and at least a first quality threshold, adjust any of T and DT.

12. The wireless communication device of claim 11, wherein the processor is configured to adjust any of T and DT by, responsive to a determination that none of the estimated cell quality values is above the first quality threshold, increasing DT.

13. The wireless communication device of claim 12, wherein the processor is configured to increase DT in a stepwise manner such that a first increase of DT, associated with a first activation of the radio receiver circuitry, is by a first factor and a second increase of DT, associated with a second activation of the radio receiver circuitry, is by a second factor that is greater than the first factor.

14. The wireless communication device of claim 12, wherein the processor is configured to increase DT to make DT equal to T or greater than T.

15. The wireless communication device of claim 11, wherein the processor is configured to adjust any of T and DT by, responsive to a determination that none of the estimated cell quality values is above the first quality threshold, applying a time offset to T associated with at least one activation of the radio receiver circuitry.

16. The wireless communication device of claim 11, wherein the processor is configured to adjust any of T and DT by:

responsive to a determination that none of the estimated cell quality values is above the first quality threshold, increasing DT, else responsive to a determination that none of the estimated cell quality values is above a second quality threshold, applying a time offset to T.

17. The wireless communication device of claim 11, wherein the processor is configured to align T with a synchronization signal of a cell that is a serving cell of the wireless communication device.

18. The wireless communication device of claim 11, wherein the processor is configured to activate the radio receiver circuitry at a first carrier frequency, and, responsive to a determination that, after a predetermined number of activations of the radio receiver circuitry, none of the estimated cell quality values is above the first quality threshold, then:

change the first carrier frequency to a second carrier frequency and continue the repeated activation of the radio receiver circuitry at the second carrier frequency.

19. The wireless communication device of claim 11, wherein the processor is configured to activate the radio receiver circuitry at a first carrier frequency, and, responsive to a determination that, after a predetermined number of activations of the radio receiver circuitry, none of the estimated cell quality values is above the first quality threshold, then:

change the first carrier frequency to a second carrier frequency; and initiate another mobility process at the second carrier frequency.

20. The wireless communication device of claim 11, wherein the processor is configured to provide the estimated quality values to the mobility process by providing the estimated quality values to any of a cell selection process, a cell reselection process and a handover process.

21. A non-transitory computer-readable storage medium storing a computer program comprising instructions that, when executed on at least one processor in a wireless communication device in a cellular wireless communication system comprising a plurality of cells, cause the wireless communication device to:

activate the radio receiver circuitry during repeated time windows, the activating having a nominal repetition time interval, T, and each repeated time window having a window duration, DT;

detect, during each DT, a plurality of synchronization signals transmitted for respective cells of the plurality of cells;

estimate, based on the detected synchronization signals, respective cell quality values for the plurality of cells;

provide the estimated quality values to a mobility process; and depending on the estimated quality values and at least a first quality threshold, adjust any of T and DT.

* * * * *